United States Patent [19]

Babcock et al.

[11] Patent Number: 4,904,435

[45] Date of Patent: Feb. 27, 1990

[54] METHOD FOR MAKING TAMPER-EVIDENT CONTAINER CLOSURE

[75] Inventors: David E. Babcock; Daniel Luch, both of Williamsport, Pa.

[73] Assignee: The West Company, Phoenixville, Pa.

[21] Appl. No.: 139,275

[22] Filed: Dec. 29, 1987

Related U.S. Application Data

[62] Division of Ser. No. 810,923, Dec. 19, 1985, Pat. No. 4,744,480.

[51] Int. Cl.$^4$ .............................................. B29C 53/02

[52] U.S. Cl. .................................... 264/154; 264/268; 425/809

[58] Field of Search ...................... 264/154, 163, 268; 425/809; 215/252

[56] References Cited

U.S. PATENT DOCUMENTS

| | | | |
|---|---|---|---|
| 3,348,718 | 10/1967 | Musy | 215/252 |
| 4,398,875 | 8/1983 | Kawashima | 425/809 |
| 4,497,765 | 2/1985 | Wilde | 425/809 |
| 4,565,295 | 1/1986 | Mori | 215/252 |
| 4,588,100 | 5/1986 | Itsubo | 215/252 |
| 4,595,547 | 6/1986 | Herr | 264/154 |
| 4,613,052 | 9/1986 | Gregory | 215/252 |

*Primary Examiner*—Jay H. Woo
*Assistant Examiner*—Jeremiah F. Durkin, II
*Attorney, Agent, or Firm*—Eugene E. Renz

[57] ABSTRACT

A method of making a tamper-evident closure cap including the steps of forming a one piece closure cap from a plastic material having a top, a skirt depending from the top and a tamper-evident band depending from the skirt. The band has a radially inward directed rib and an annular portion between the skirt and the tamper-evident band. The annular portion is engaged with a cutting blade which has a cutting edge and series of spaced notches. The blade and the cap are rotated to form a plurality of circumferentially spaced bridges with a series of angularly inwardly disposed tabs.

2 Claims, 7 Drawing Sheets

Fig.15B. (off)

BEFORE APPLICATION

DURING APPLICATION

UNDESIRABLE CONDITION OCCURING
DURING CLOSURE REMOVAL

SEATED ON BOTTLE

METHOD FOR MAKING TAMPER-EVIDENT CONTAINER CLOSURE

This is a divisional application of pending application Ser. No. 810,923, filed Dec. 19, 1985, now U.S. Pat. No. 4,744,480.

FIELD OF THE INVENTION

The present invention relates to tamper-evident closures and more specifically, to a tamper-evident closure characterized by novel features of construction and arrangement providing ease of assembly and disassembly and one which is economical to manufacture and assemble.

BACKGROUND OF THE INVENTION

"Snap-ring" plastic tamper-evident closures are not new per se. The prior art as typified by Mumford et al U.S. Pat. No. 4,432,461 and Fields U.S. Pat. No. 3,329,295 show container closures of the general type to which the present invention relates. These closures typically comprise a cap of cup-like form having internal threads which cooperate with threads on a container finish and a tamper-evident band or ring depending from the lower terminal edge of the shirt portion of the cap and connected thereto by a series of circumferentially spaced fracturable bridge connections. The tamper-evident band usually includes locking means in the form of a rib which engages under a radially outwardly directed bead or flange below the threads on the container. By this construction, the cap may be applied to the container in the usual manner by threading to a position where the tamper-evident band expands to allow its inwardly directed rib to "snap" over the bead or flange on the bottle finish. These closures are referred to herein as "snap-ring" type closures. Now when the cap is rotated to remove it from the container, the rib and bead interengage to effect fracture of the bridges permitting removal of the cap portion and leaving the break-away band attached to the container as evidence that the cap has been once removed and the container seal broken. Typically, these closures, including the bridges, are molded of plastic material in a conventional plastic molding operation.

The patent to Hannon No. 3,861,551 is of interest in that it shows a method for slitting and scoring metal caps in preselected areas.

One of the drawbacks and disadvantages of the prior art tamper-evident closures described above is related to the mechanics of application. Ideally, on application the tamper-evident band expands uniformly over the bottle restriction or bead. However, some factors prevent this ideal from actually being achieved. The geometric configuration of the bottle finish bead can be a major reason for non-uniform ring expansion. Container neck ovality, profile variations, variations in clearnaces and thread engagement also contribute to non-uniform band expansion. In addition, because the band and cap skirt are connected by flexible bridges, the band can shift in a direction perpendicular to the axis of the cap referred to herein as "lateral shifting" as illustrated in FIGS. 16–18 inclusive. In poorly designed systems, the above deviations from the ideal can cause application problems as follows: (1) "telescoping" of the band up around the cap skirt; and (2) excessive lateral shifting of the ring and the resultant adverse affects. These affects can best be described and understood with reference to the various illustrations in the drawings and particularly FIGS. 16–18 which illustrate common closure mechanics of prior art container-closure systems. As the cap is applied, the tamper-evident ring shifts laterally as illustrated in FIG. 17. The magnitude of this shift depends on clearance between the bottle finish and the cap and the magnitude of the bottle diameter. Contined application causes a part of the tamper-evident band to jump over the bead on the bottle producing the effect shown in FIG. 17*b*, that is cocking of the tamper-evident band and non-uniform deformation of the bridges. This deformation may result in bridge breakage during application and uneven fracturing of the bridges during removal even in cases where the bridges may be uniformly stressed during the removal process as described in more detail below. The action of the cap applied in this manner is known as "tire-on". Even though the mechanism of "tire-on" in some cases may reduce torque required to apply the "snap ring" closure, the ring shift produced by "tire-on", if excessive, can cause bridge break during application, the non-uniform straining of the bridge members and displacement of the ring into the cap in the manner illustrated in FIG. 17*b*. This latter effect can result in "application lock", which means that the torque sensitive chuck of the automatic assembly equipment releases the cap before complete application to the container.

Further, it has been observed that in prior art arrangements, upon removal of the cap, the interaction between the tamper-evident ring and the bottle finish bead is insufficient to produce the desired complete ring separation and retention on the container. Generally to achieve proper ring break away on initial removal, one designs a snap-ring closure of the type under consideration such that hoop forces maintained in expanding the tamper-evident ring over the bottle restriction are greater than the combined tensile strength of the bridges. Typically, the magnitude of these hoop forces can be determined on a torque gauge using unslit caps. Many factors can interfere and thwart this design criterion, such as the following: (1) poorly designed, minimum diameter bottle bead/maximum diameter cap rib which minimizes removal interference, possibly conbined with excessively strong bridges; (2) ductile material formulations which promote yielding and elasticity; (3) container finishes which do not allow the tamper-evident ring to relax sufficiently after application; and (4) container bead designs which do not permit proper cooperative interengagement of ring rib and bead during the bridge fracturing portion of the removal cycle.

In addition to the above, one other factor which has consistently thwarted the interference design criterion in prior art systems is the effect illustrated in FIG. 19 which is commonly encountered when the cap is threaded to a position where the bridges begin to break, and the cap and ring separate non-uniformly because the bridges do not break simultaneously. The tamper-evident ring assumes an undesirable angular relationship relative to a horizontal plane. When this happens, ultimate performance is highly erratic. The ring retention forces developed by interference of the container bead with the cap tamper-evident rib are dramatically decreased when the ring assumes the angular position shown in FIG. 19. In addition the ring is now permitted to pass over the container bead in a segmental, torsional motion known as "tiring off", approximately the reverse of the "tire on" mechanism discussed above. This motion is aptly named because it is the same mechanism by which a rubber tire is applied or removed from a rim. Tiring requires less force to move the ring over the container restriction than the uniform expansion desirable. The design interference criterion is thereby thwarted and the ring may come off the bottle finish still attached to the closure portion.

SUMMARY OF THE INVENTION

With the foregoing in mind, it is an object of the present invention to provide a tamper-evident container-closure assembly characterized by novel features of construction and arrangement which eliminates the disadvantages and drawbacks of prior closures discussed above. It is also an object of the present invention to provide a process or method for making these closures which has unique features contributing to economy of manufacture and ease of forming various structural details which contribute to the improved performance of tamper-proof closures made in accordance with the present invention.

The container finish bead configuration of the present invention overcomes the disadvantages and drawbacks of the prior art and produces the following functional advantages:

(1) Minimization of lateral shifting of the tamper-evident band on application. This eliminates premature bridge failure, non-uniform stretching of bridges and band lock-up during application. (2) Increased mechanical advantage as the band strain increases during expansion to overcome the container restriction or bead on application. This reduces the magnitude of application torque required to apply the closure. (3) Allows the tamper-evident band to relax toward its natural pre-application dimensions following application in a two-step fashion thereby minimizing shock and excessive bridge straining and possible breakage. (4) Promotes bridge breakage on removal by guiding the cap tamper-evident band to an essentially horizontal and locked position during initial removal of the closure. This positioning requires the break-away band to expand essentially uniformly against the bottle bead restriction as the closure is first removed, thereby facilitating breaking of all the bridges and eliminating the tire-off effect during the initial removal of the cap from the container.

Also, important characteristics of the closure structure are disclosed hereafter which facilitate and improve both application and removal functions compared to the prior art including particularly the configuration of the closure in the region of the fracturable bridges and the cross-sectional design of the tamper-evident band.

In general, the invention comprises a system of closure and container finish and a novel manufacturing process for making the closures. The closure and container finish of the present invention combine to facilitate closure application and sealing using conventional capping equipment and with a minimum of production difficulty. This contrasts with prior art snap-ring tamper evident closures wherein substantially increased application torques are often required to achieve complete application. Increased application torques result in increased equipment maintenance, excessive removal torques and unsightly bulging of the cap as applied.

Upon initial unscrewing of the cap, the tamper-evident rib slides over a gradual ramp in the order of 30°-45° to the container axis, over a restricting bead. Once over the bead, the ring is essentially locked in position in a groove having diameter greater than the natural diameter of the band rib. Locking the band in this manner holds the band in a horizontal position preventing the harmful effects occurring when the band drops from horizontal as is characteristic of the prior art. In addition, the pre-expansion of the ring causes it to simulate a rubber band and creates resistance to rotation. Thus, as the cap is unscrewed the band is forced to expand uniformly and it locks tighter and tighter thereby further preventing rotation and placing additional stress on the bridges. In accordance with the present design, the tamper-evident band once severed generally remains in place in the groove until reapplication of the cap which then forces it downwardly. Thus, the container cannot be resealed without giving evidence that the container has been once opened.

It is noted that the bead or profile on the container does not have to be coninuous around the circumference, but can be segmented.

The method for making a tamper-evident closure in accordance with the present invention consists of the steps of first molding a one-piece closure and tamper-evident band in the configuration shown in FIG. 3 and thereafter forming mechanically, by a slitting operation, the fracturable bridges and angularly disposed bumper elements on the upper edge of the tamper-evident band between the tamper-evident band and the cap portion. This configuration eliminates telescoping and the geometric configuration of the bumpers effectively increases the contact area available to accept the compressive forces encountered as the cap skirt pushes the tamper-evident band over the container band. Thus, the membrane or web through which the slitting occurs can be reduced to a minimum, typically 0.008 to 0.025 inch, allowing easier and more consistent slitting.

The mechanical slitting process preferably utilizes an anvil which engages interiorly of the cap and a slitting blade having a plurality of spaced blade segments having a sharp beveled cutting edge. It has been found that the cutting process taught can be run at high production rates of more than 600 caps per minute without bridge breakage. It has also been observed that this blade configuration produces a consistent, repeatable bridge strength. The process also allows simultaneous formation of the bridges and the bumper elements which serve to prevent lateral shifting of the tamper-evident band when applying the cap to the container. This method also presents the option of facilitating slitting and forming of the cap in either a hot or cold state and with a large variety of resins and compounds. It has also been found that this process permits processing in a highly economical and efficient manner. The cutting knife is interchangeable and adjustable which permits variations in bridge geometry and strength if necessary in a simple and effective way. For example, the knife can be so designed as to give a score or notch on the formed bridges to predefine eventual break point and strength, or bridges varying in strength around the cap circumference can be produced if desired.

BRIEF DESCRIPTION OF THE DRAWINGS

These and other objects of the present invention and the various features and details of a closure and container finish made in accordance with the present invention and the method for making the closure are hereinafter more fully set forth with reference to the accompanying drawings, wherein:

FIGS. 15*a*, 15*b* and 15*c* are views illustrating removal and reapplication of the closure;

DESCRIPTION OF THE PREFERRED EMBODIMENT

Figure 1:
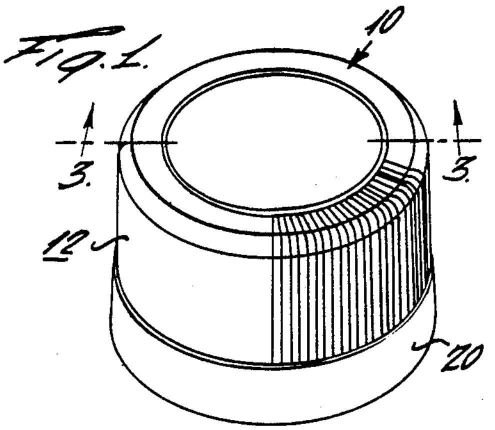
FIG. 1 is a perspective view of a closure cap prior to the simultaneous forming of bridges and bumpers in accordance with the invention.
Figure 2:
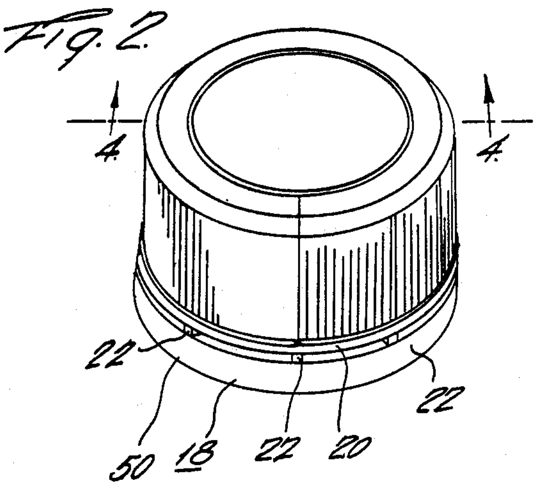
FIG. 2 is a view similar to FIG. 1 but showing the finished cap comprising a tamper-evident band attached to the upper cap body by means of fracturable bridges and also comprising inwardly directed bumper segments formed in accordance with this invention to facilitate closure application.

Referring now to the drawings and particularly to FIGS. 1–15 thereof, there is illustrated a container-closure assembly generally designated by the numeral 10 constructed in accordance with the present invention. Considering the basic elements of the container-closure assembly 10, the closure comprises a cap of cup-like form 12 having internal threads 14 which mesh with threads 16 on the container finish and a tamper-evident band 18 connected to the lower terminal edge of the skirt portion 20 of the cap by a series of fracturable bridges 22. The container finish generally designated by numeral 30 includes the standard external threads 16 adjacent the discharge opening 32, a tamper-evident ring retaining bead 34 disposed below the threads and a second bead or flange 36 spaced axially below the tamper-evident retaining bead 34.

Figure 3:
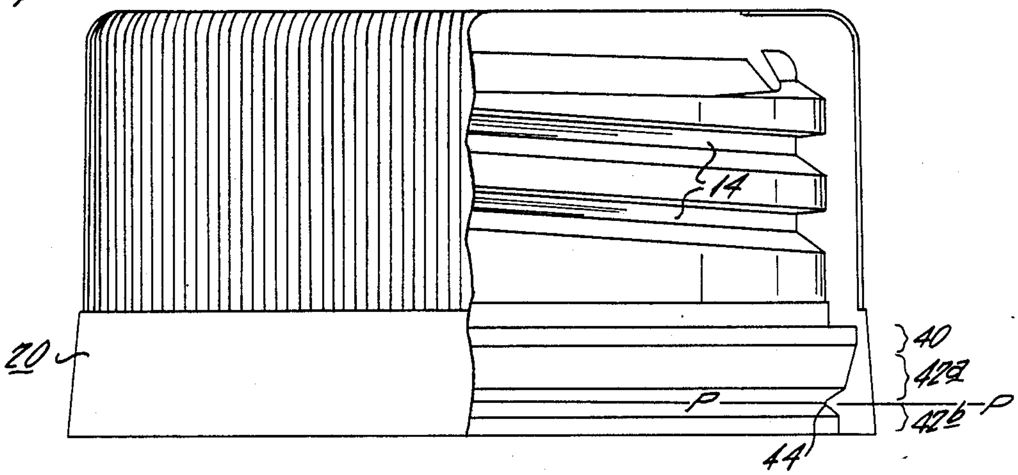
FIG. 3 is an enlarged partially sectioned side elevational view of the cap shown in FIG. 1 taken along the line 3—3 of FIG. 1.
Figure 4:
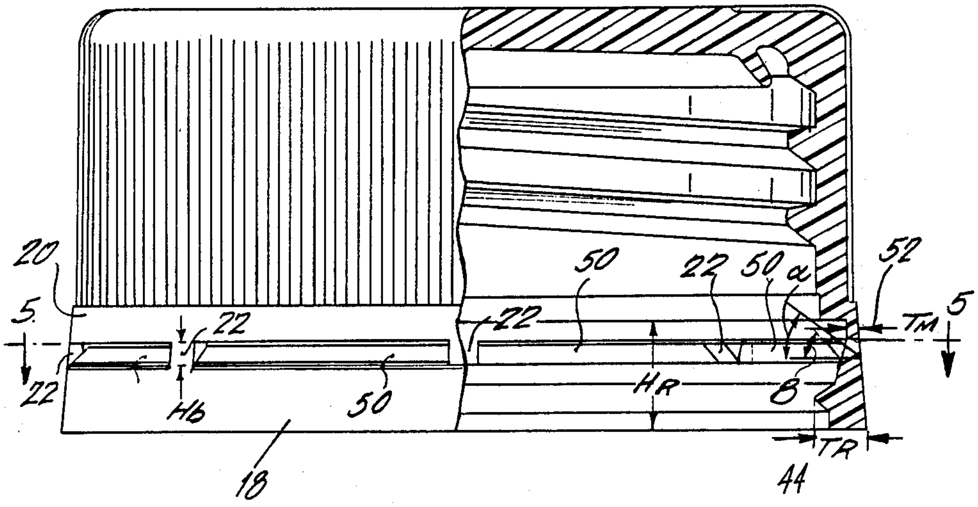
FIG. 4 is an enlarged partially sectioned side elevational view of the finished cap shown in FIG. 2 taken on the line 4—4 of FIG. 2.
Figure 5:
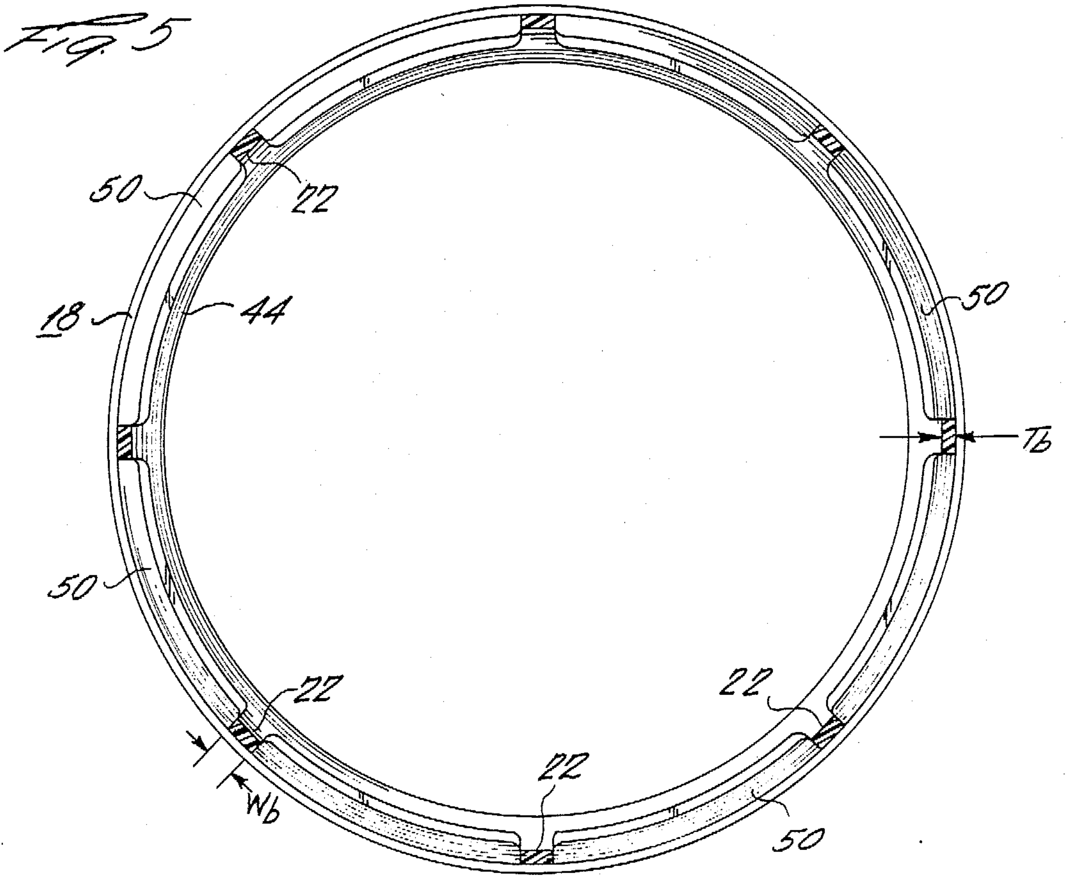
FIG. 5 is a sectional plan view taken on the line 5—5 of FIG. 4 showing additional details of the connecting bridges and bumper segments shown in FIG. 4.

Considering specifically the structural details and arrangement of the container closure in accordance with the present invention, as illustrated in FIGS. 3 and 4, the tear band 18 of the shirt portion 20 is of a predetermined cross-section greater than the area 40 contiguous to the lower terminal edge of the skirt portion 20 thereof wherein the bridges are formed and the tamper-evident band 18 is of an enlarged cross-section including a circumferentially extending radially inwardly directed rib 44. In this embodiment the tamper-evident band comprises a first section 42*a* of generally triangular cross-section and a lower section of generally rectangular cross-section 42*b*. This is one possible arrangement for achieving a preferred design criterion of the tamper-evident break-away band, that being that the center of mass of the tamper-evident band be below the height of the ring pivot point. Thus, in the embodiment of FIG. 3, the center of mass of the tamper-evident band is below a horizontal plane P—P through the rib 44. Having the center of mass disposed in this way below the ring rib inhibits ring flaring during initial removal and thereby promotes greater interference between the band and container beads. The torsional motion of band or ring flaring involves relatively greater strain of that mass located below the pivot point P of rib 44 compared to that in the sidewall portion of the band above pivot P. Thus, mass located below the pivot point P has the important role of inhibiting ring flaring.

The closure also includes a series of circumferentially spaced bumpers or lip sections 50 which are formed during the slitting process in a manner described in more detail below and which are beveled slightly inwardly in the manner shown in FIG. 4 to interengage with a shoulder 52 formed at the lower edge of the skirt portion 20 and thereby prevent telescoping of the tamper-evident band 18 during application of the closure. These bumpers 50 also serve to minimize the lateral displacement of the band 18 and present an increased surface area to accept the compressive forces imparted to the band in being pushed over the container restriction or bead 34. Thus, the bumpers 50 act to inhibit excessive band and bridge strain non-uniformities on application.

Figure 14A:
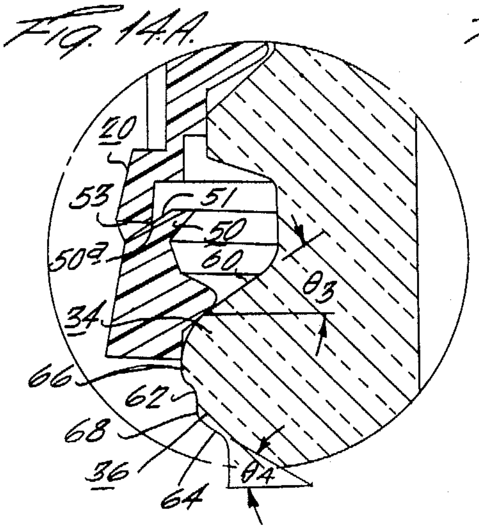
FIGS. 14*a* and 14*b* are enlarged fragmentary sectional views of the encircled areas of FIG. 13*a;*
Figure 14B:
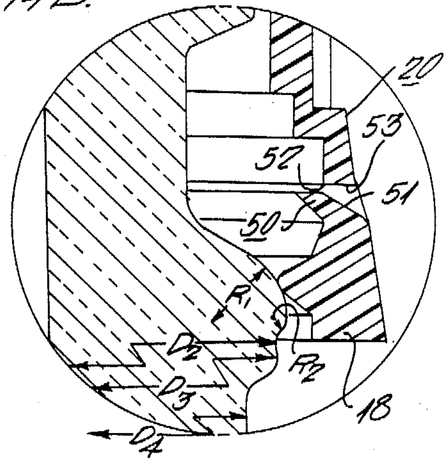
Figure 17A:
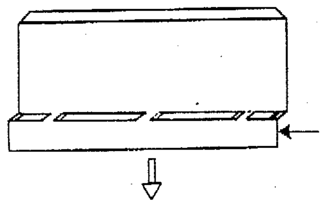
FIG. 17A. (PRIOR ART)
Figure 19:
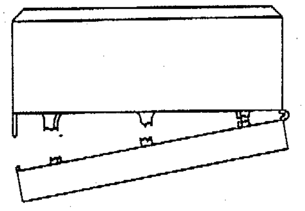
FIG. 19. (PRIOR ART)
Figure 17B:
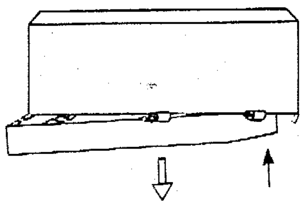

Specifically, as illustrated in FIG. 14*b*, the bumper 50 extends inwardly at a predetermined angle $\alpha$ so that its beveled face 51 underlies the shoulder 52 and during assembly of the cap on the container, the lower terminal edge 53 of the skirt 20 engages the outer beveled face 51 of the bumper 50 at approximately its midpoint 50*a* in the manner illustrated in 14*a* thereby to center the retaining ring relative to the cap and prevent lateral shifting thereof as illustrated in FIG. 17. Note that in the relaxed state, the lower terminal edge 53 of the skirt portion of the cap is spaced from the inclined outer surface 51 of the bumper in the manner illustrated in FIG. 14*b*. This clearance is maintained as small as possible to minimize compression of the bridges during the assembly process and promote axial alignment of the band during the assembly process. (See FIG. 14*a*)

Figure 13:
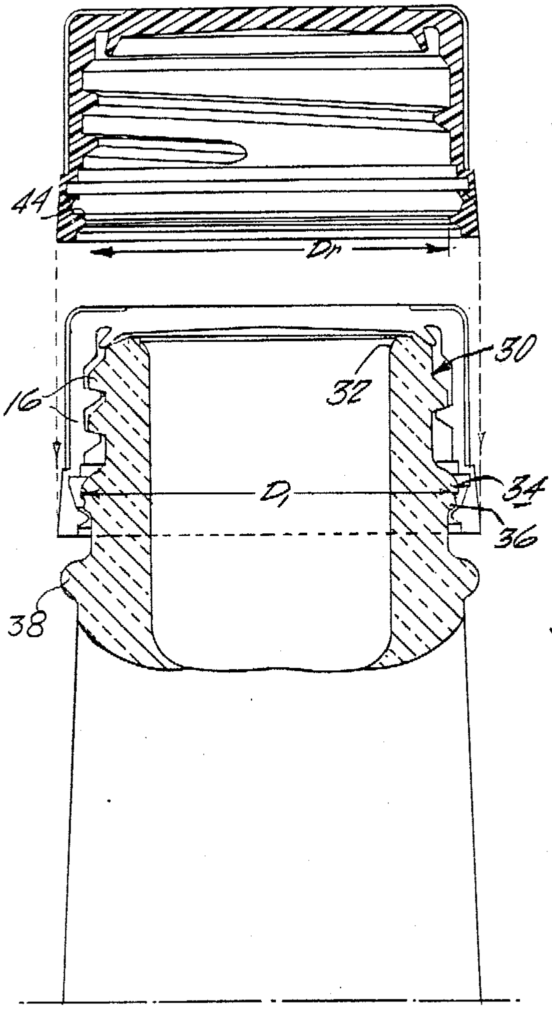
FIGS. 13 and 13*a* are views partly in section of the closure being assembled to a container.

The retaining bead 34 on the container disposed below the threads as best illustrated in FIGS. 13 and 14 includes a truncated conical entrance or application ramp section 60, a circumferentially extending groove 62 located between the retaining bead 34 and the bead 36. The arcuate faced base of the truncated conical entrance ramp 60 forms a shoulder of greatest diameter designated 66. The lower portion of the bead 36 has an inverted truncated conical portion providing a removal ramp designated 64 below the groove 62. As best illustrated in FIGS. 14*a* and 14*b*, the entrance ramp 60 merges with the base apex 66 in an arcuate connecting wall section having a predetermined radius configuration providing a mechanical advantage upon assembly of the cap as explained in more detail below. This radius is generally greater than 0.045 inches. The removal ramp section 64 also merges with the locking groove 62 in typically an arcuate connecting wall 68 having a predetermined radius configuration facilitating displacement of the retaining band to a horizontal locked position in the groove 62.

Figure 15C:
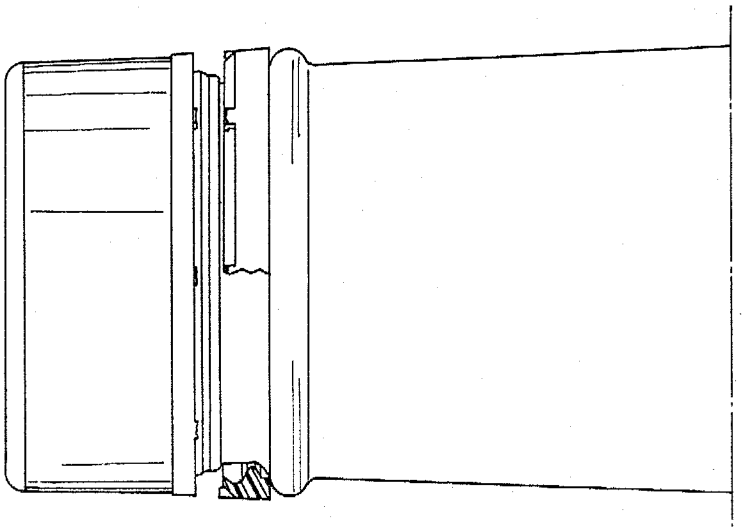
Figure 15A:
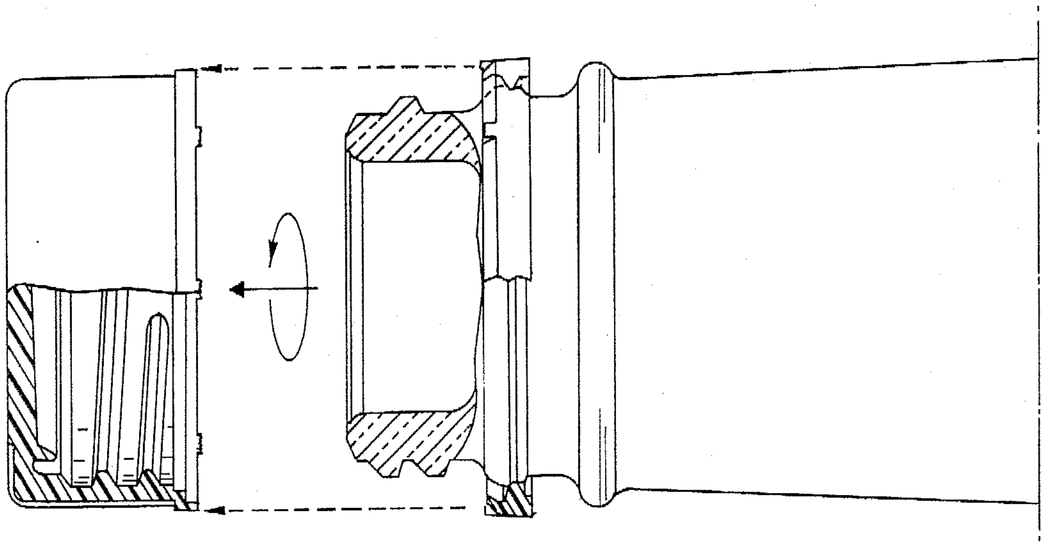
Figure 15A:
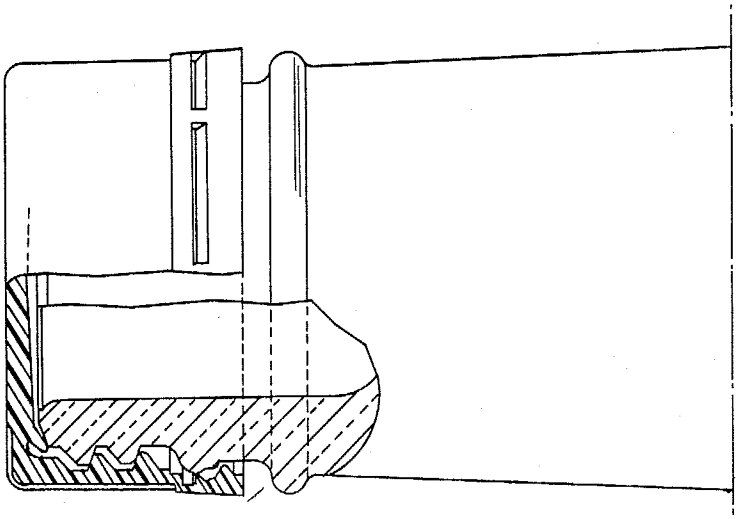
Figure 16:
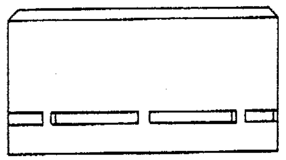
FIG. 16 (PRIOR ART)
FIGS. 16, 17, 18 and 19 are views of prior art closures.

The inner diameter $D_r$ of rib 44 and the maximum diameter $D_1$ of the retaining bead 34 are of a predetermined relation so that the rib 44 will ride over the entrance ramp section 60 and engage below the removal ramp section 64 when the cap is in the fully seated position shown in FIG. 15*a* and in phantom outline in FIG. 13.

The preferred diametrical relationships and slope configurations to produce the desired ease of assembly of the closure and retention of the retaining ring upon removal for a container-closure assembly of specific size and configuration are set forth below. (See FIG. 14*b*)

| TYPICAL DIMENSIONS | | |
|---|---|---|
| | 28 mm Container Finish | |
| | $R_1$ | .073" |
| | $R_2$ | .010" |
| | $D_1$ | 1.139" |
| | $D_2$ | 1.107" |
| | $D_3$ | 1.113" |
| | $D_4$ | 1.095" |
| | $\theta_3$ | 45° |
| | $\theta_4$ | 45°-60° |
| | 28 mm Closure | |
| | $D_r$ | 1.095" |
| | $T_m$ | .015" |
| | $T_r$ | .080" |
| | $H_r$ | .170" |
| | $\theta_1$ | 55°-75° |
| | $\theta_2$ | 30°-55° |
| | $\alpha$ | 35° |
| | $\beta$ | 45° |
| | Dimension of TYPICAL Bridge | |
| $H_b$ | Bridge Height | .020" |
| $T_b$ | Bridge Thickness | .015" |
| $W_b$ | Bridge Width | .040" |
| | Number of Bridges | |
| | For 28 mm, 8 | |

Number of bridges will increase as cap diameter, i.e. 33 mm may have 10.

Figure 13A:
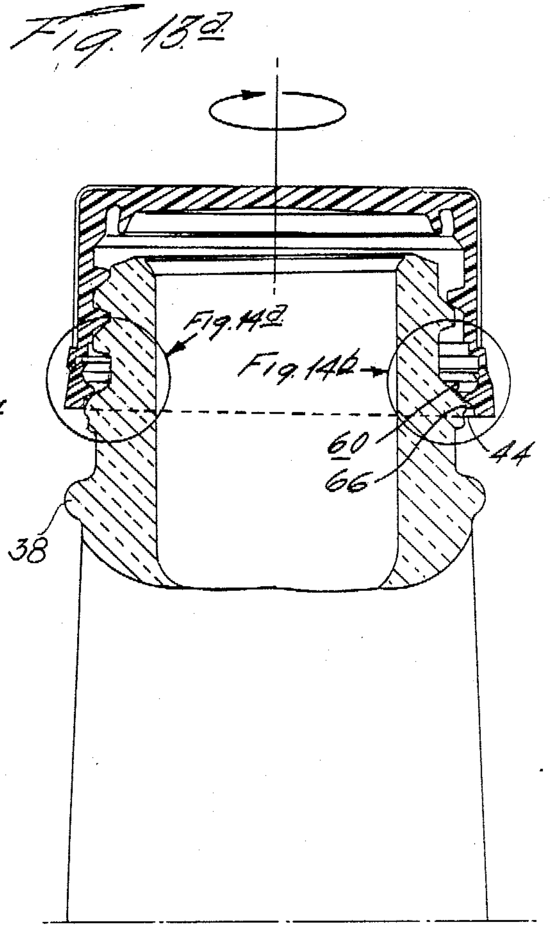

Reviewing briefly the assembly and removal of a container-closure assembly in accordance with the present invention and with particular reference to FIGS. 13 and 13*a*, note that when the closure-assembly is applied to the container and threaded in a direction to apply the cap, the rib 44 engages the entrance ramp section 60 adjacent the apex 66 until the rib 44 passes the apex 66 and the various bridges are slightly compressed.

The arcuate connecting wall having a relatively large radius in advance of the apex provides a mechanical advantage during application of the closure. For example, when the band is expanded as it is moved over the planar entrance ramp section 60, the torque force required to move the retaining band to the apex 66 increases as the band is stretched. However, when the retaining rib 44 moves to the radiused portion adjacent the apex 66, the torque force levels off and is substantially the same during further slight expansion of the tamper-evident band until it by-passes the apex. The reason for this in the mechanical advantage provided by the large radius $R_1$ at the juncture of the entrance ramp 60 and apex 66 portion of the retaining bead. More specifically, the reason for the mechanical advantage can be explained in the following manner. The slope of the curve of connecting wall $R_1$ increases as you approach the apex 66 which means that for given increments of expansion of the band at the maximum point of expansion, that is approaching the apex, the distance of thread turn per equal increment of expansion increases as you approach the apex. As noted above, this means that the application torque levels off even though there is continued stretching of the tamper-evident band in the region immediately preceding the apex.

It is noted, however, that in some instances particularly with large diameter closures, during the initial removal process, as the band is being expanded while traversing the truncated conical discharge ramp 64 prior to attaining a position where the rib 44 locks in the groove 62 above the bottle finish bead 36, premature breakage of some of the bridges may result. In an arcuate portion of the tamper-evident band where the bridges break prematurely, the band rib 44 is disposed below the groove 62 while the remainder of the band rib 44 is disposed below the groove 62 while the remainder of the band rib 44 tracks and seats in the groove, the bridges in this region remaining intact. However, continued turning of the cap 10 now results in fracture of all the bridges and retention of the tamper-evident band on the container finish since the portion of the band which tracks properly and is seated in the groove maintains the band in an essentially horizontal expanded position. A contributing factor to achieving this is that the container finish diameter below the discharge ramp $D_4$ is preferably about equal to the diameter $D_r$ of the band rib 44 in the relaxed state thereby maintaining the band in a stressed condition.

Recapping the features and operation of a container-closure assembly in accordance with the present invention, the beveled lip of the inwardly directed bumper segments 50 engage the shoulder 52 at the lower terminal edge of the shirt to prevent telescoping of the tamper-evident band when applying the cap and also to prevent premature bridge breakage. The bumpers 50 also next in a manner to prevent lateral shifting of the tamper-evident band which would tend to stress the connecting bridges in a non-uniform fashion and promote band "lockup". After traversing the apex of the container restriction 66, the rib 44 initially falls into groove 62, and on continued application is pushed over lower bead 36. It has been noted that this two-step relaxation after full expansion is far less strenuous on the bridges than complete relaxation in a single step. Where bridge fracture was observed in a single "snap" relaxation, the two step container profile allowed application without bridge damage. After the cap is fully applied, the bead 44 is disposed slightly below the removal ramp section 64 of the tamper-evident retaining bead 34. Now when it is desired to remove the closure, the cap portion is simply threaded in the direction to remove it whereupon the rib 44 slides over the removal ramp section 64 and snaps into the circumferentially extending groove 62. By this action the retaining band is temporarily locked in a horizontal position to effect substantially uniform breaking of all the bridges as the cap portion is moved axially upwardly during removal rotation thereof. Now when the cap is re-applied, the shoulder abuts the bumper elements and displaces the tamper-evident band so that it lies loosely in the space between the bead 34 and flange 38.

Figure 20:
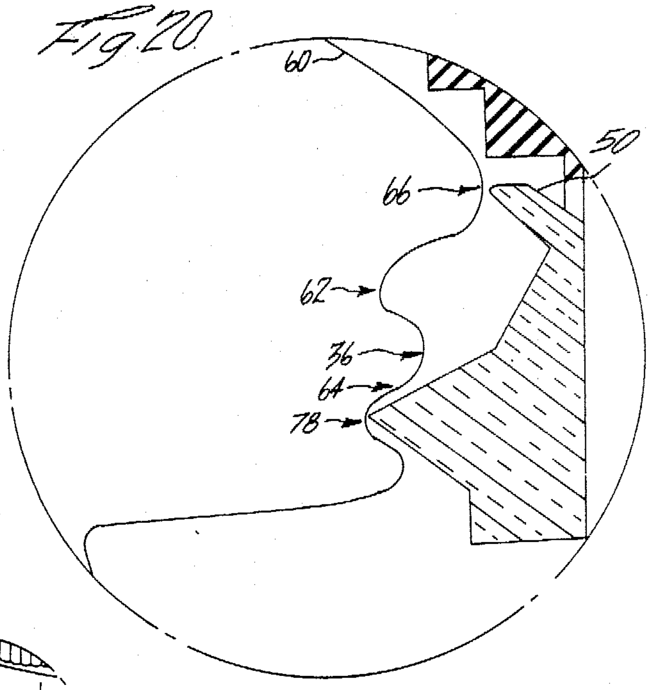
FIG. 20 is a fragmentary sectional view showing a modified container finish in accordance with the present invention.
Figure 18:
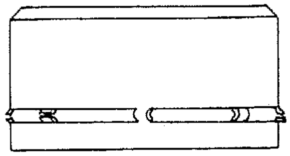
FIG. 18. (PRIOR ART)
Figure 21:
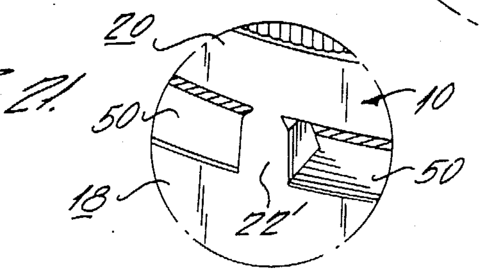
FIG. 21 is a fragmentary perspective view of a modified bridge configuration in accordance with the present invention.

With some types of plastic containers, particularly injection/blow molded plastic containers, it is desirable to substantially reduce the outer diameter of the container neck below the bottle restriction bead. This is generally done to save on the amount of plastic material used. In these cases, if premature bridge breakage prevents the entire rib 44 from achieving groove 62, the ring can shift dramatically into the large container undercut defined by the reduced diameter. In these cases it has been found desirable to incorporate a secondary groove 78 axially placed below the primary groove 62 as depicted in FIG. 20. Secondary groove 78 has a diameter $D_5$ substantially equal to the diameter of $D_r$ of rib 44, thereby allowing the tamper-evident ring to relax after application but preventing excessive ring shifting should premature bridge breakage prevent the entire rib 44 from reaching the locked position of groove 62. This arrangement functions, therefore, in the same manner as the previously described embodiment and the $D_r$, $D_4$ relationship.

Figure 6:
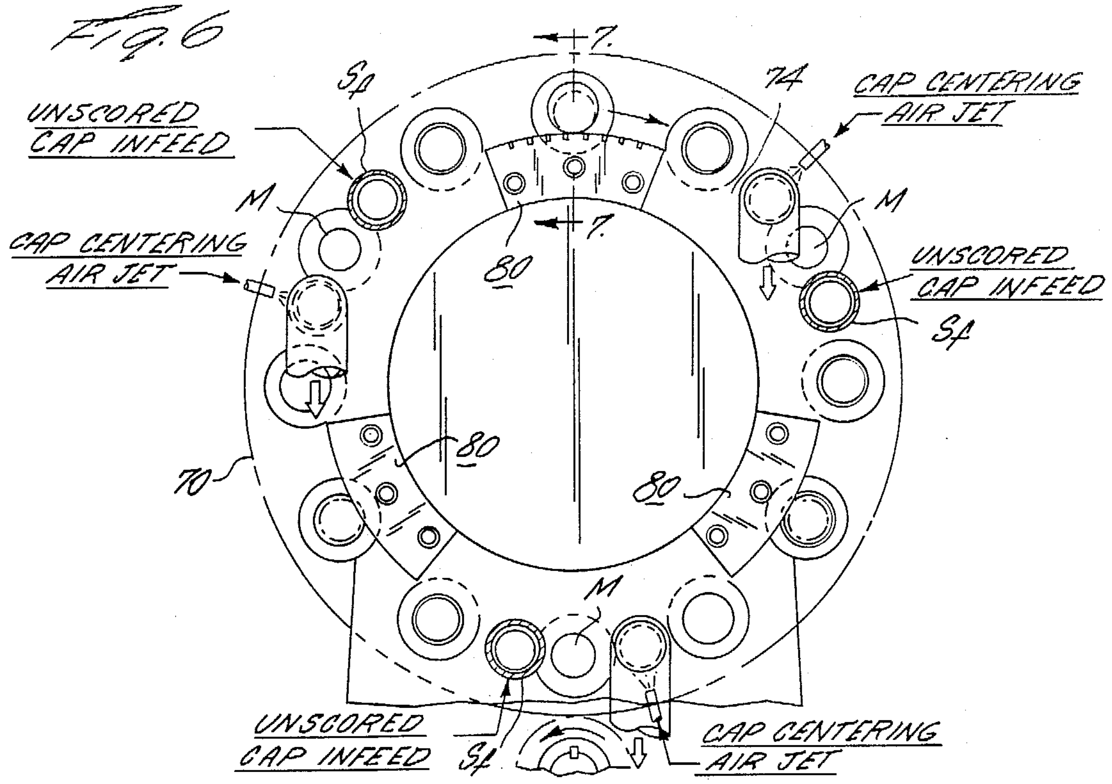
FIG. 6 is a schematic front elevational view of a machine for continuously forming tamper-evident closure members in accordance with this invention.
Figure 7:
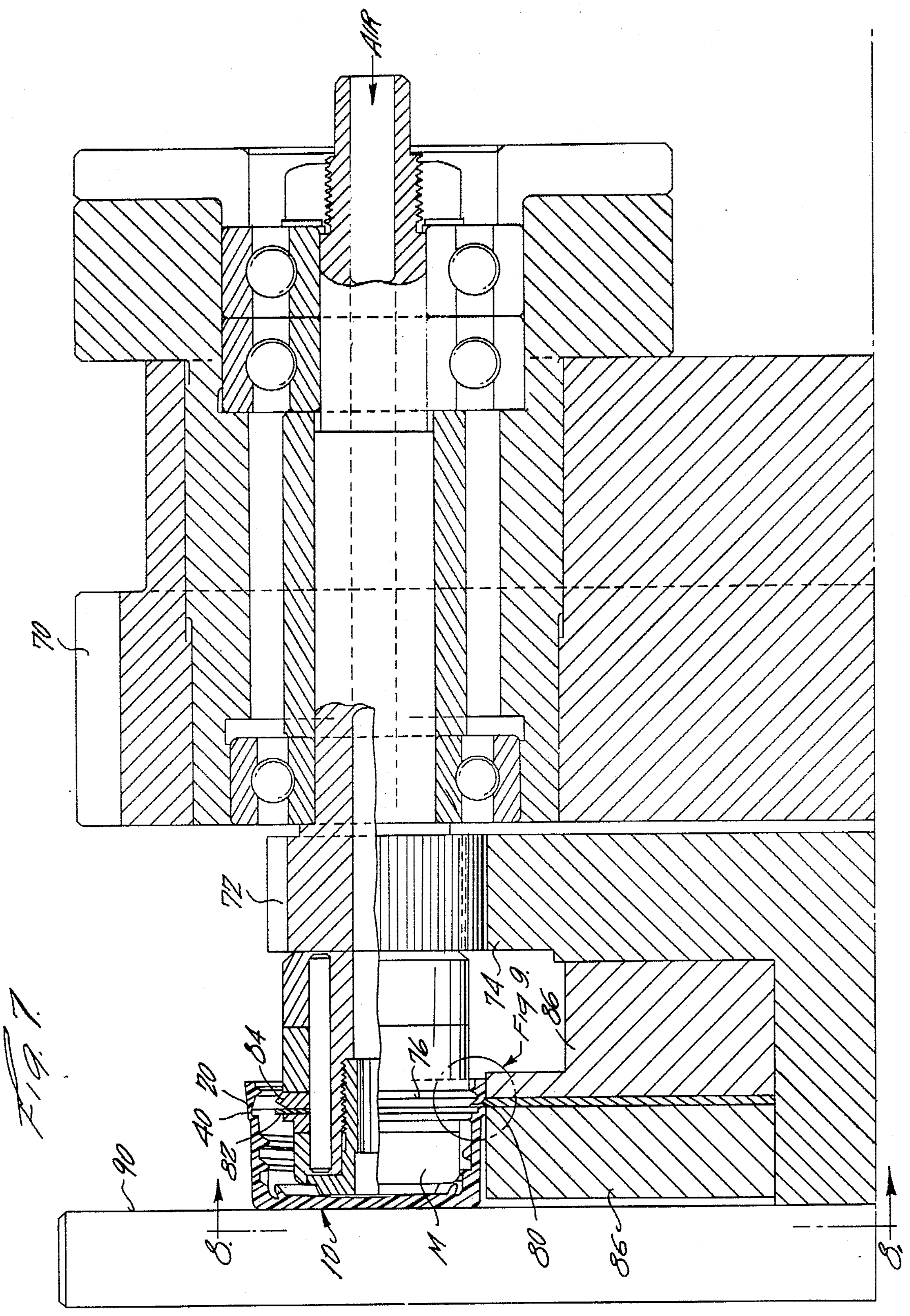
FIG. 7 is an enlarged fragmentary side elevational view taken on the line 7—7 of FIG. 6 showing details of the construction of a single forming mandrel and associated tamper-evident cap being formed by means of this invention.
Figure 8:
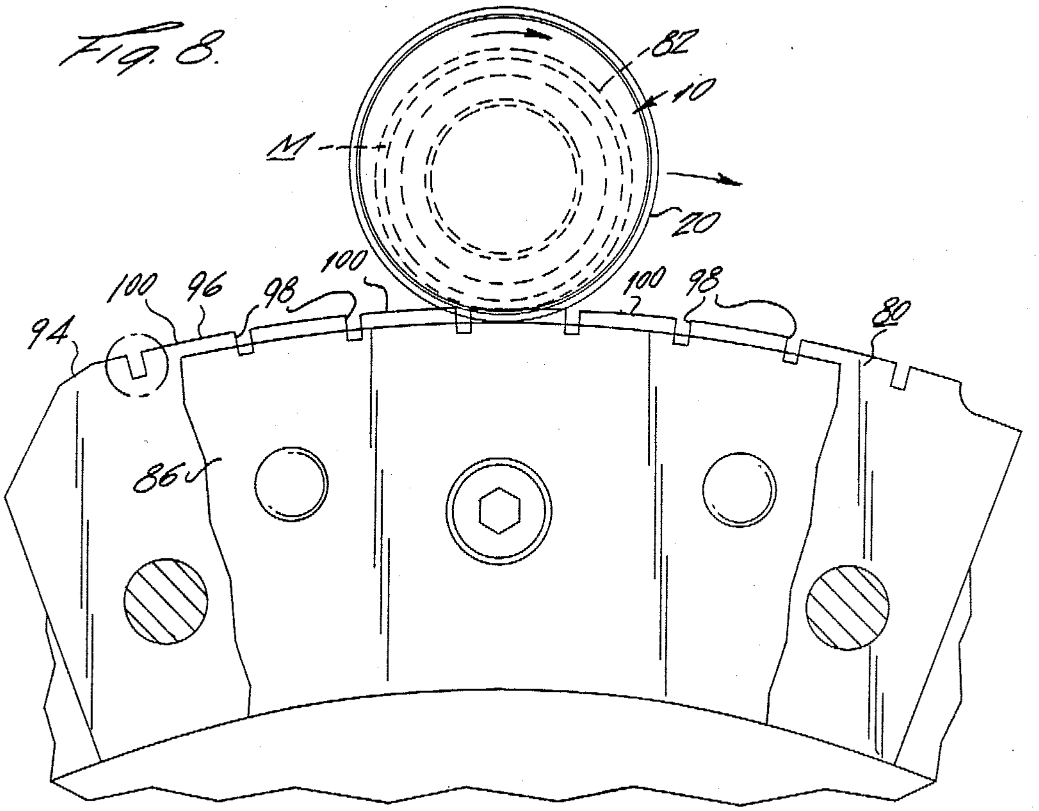
FIG. 8 is a front elevational sectional view taken on the line 8—8 of FIG. 7 showing a segmental arcuate knife for the forming of the spaced bridges and bumpers on the closure shown traversing its upper surface.
Figure 10:
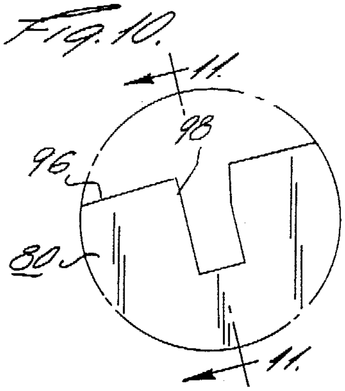
FIG. 10 is an enlarged view of the bridge forming slits of the arcuate segmental knife.
Figure 11:
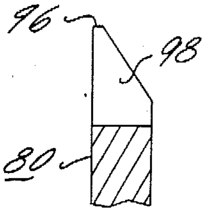
FIG. 11 is a sectional view taken on lines 11—11 of FIG. 10.
Figure 12:
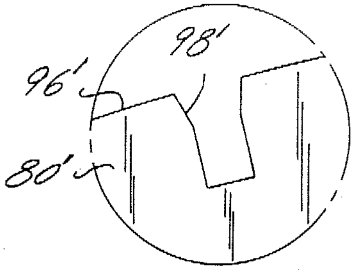
FIG. 12 is a fragmentary view of a variation of the cutting edge.
Figure 9:
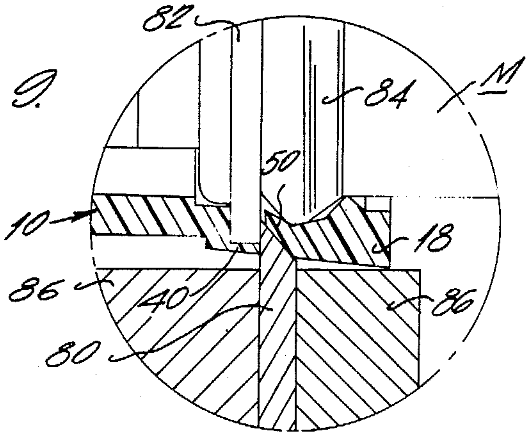
FIG. 9 is a greatly enlarged sectional view of the detail contained within the dot and dash circle of FIG. 7.

There is illustrated in FIGS. 6–8, a method and apparatus for manufacturing closure assemblies in accordance with the present invention. FIG. 6 illustrates schematically a system or method for forming the bridges and bumpers in closures made in accordance with the present invention. In the present instance three stations are illustrated. Each station includes a feed station $S_f$ for delivering unscored caps open side up to a mandril which engages interiorly of the cap and rotates the same over the acruate cutting edge of a cutting blade of generally circular configuration. The mandril M rotates the cap through 360°+ to form all the bridges and thereafter jets may be utilized to discharge the finished cap. At the end of the cutting cycle, the cap has been rotated by the mandril M to a position outboard of the pressure plate 90 to permit the air jets to discharge the finished cap from the mandril to a collection conveyor or the like.

Considering now more specifically the details and arrangement of the mandril M and the finishing of unscored caps, it is noted that in the initial molding operation, the sidewall 40 connecting the skirt portion of the cap to the retaining bead 44 is formed continuously of a predetermined uniform cross-section preferably 0.008 inch to 0.025 inch. The caps in this form are then fed to a bridge and bumper forming station wherein an anvil engages interiorally of the cap in the manner shown in FIG. 7. As illustrated, the caps are positioned open side up against a pressure plate and the anvil includes a forming section 76 which confronts the inner surface of the connecting wall 40 which rotates the closures over a segmented cutting blade having the cutting tooth configuration shown in FIG. 8. In FIG. 8 the cutting knife is shown of a generally arcuate geometry. The blade aligns adjacent the anvil and upon relative rotation of the cap and the blade produces the circumferentially spaced bridges 22 and the inwardly inclined bumpers which are formed by a swaging operation. Note that the cutting blade segments may have terminal beveled edges 94 to establish proper lead-in of blade to cap and prevent marking of the cap throughout their length.

The elements and arrangement of the mandril M are best described in FIG. 7 and includes a drive gear 70 which rotatably mounts planetary gears 72 which in turn rotates about a fixed sun gear 74. As illustrated, the forming anvil 76 is fixedly mounted to the planetary gear so that operation of the drive gear effects rotational as well as clockwise rotation of entire mandril assembly M over the stationary cutting blade 80. The mandril M as illustrated includes a shear plate82 and a forming mandril 84 which, as illustrated, cooperate with the cutting blade to form the bumper sections 50 by a swaging action. Note that the cutting blade is mounted between back-up blocks 86 and the cap normally confronts a retainer plate 90 during the cutting and forming operation. The upper terminal edge 96 of the arcuate cutting blades has a series of equally-spaced notches 98. These notches 98 create the bridges 22 and the intermediate arcuate segments 100 create the bumper portions 50 as the mandril carries the cap 10 across the upper surface of the blades.

Even though the system and apparatus for forming the bridges and the bumpers is described in connection with a cutting blade of arcuate configuration, it is to be understood that a linear, straight-edge blade of the same configuration can be employed and the cap simply rotated over the edge of the blade in much the same manner as described above.

Additionally the system and apparatus described blade may be modified so that the bridge configuration and design may be selectively varied. For example, the cutting tooth configuration may be designed to form notches in the bridges adjacent the skirt of the cap to produce a bridge section of smaller cross section at this juncture and, therefore, fracturing of all the bridges adjacent the lower edge of the skirt during the removal process. This arrangement provides a cap that is perhaps more esthetically pleasing. This may provide advantages in controlling the strength of the bridge and thereby control more accurately the torque required to fracture the bridges during removal of the cap.

What is claimed is:

1. A method for making a tamper-evident closure cap consisting of the steps of forming a one-piece closure cap from a plastic material having a top, a skirt depending from the top, and a tamper-evident band depending from the skirt and having a radially inward directed rib adjacent a lower terminal edge of the tamper-evident band and an annular portion between the skirt portion of the cap and the tamper-evident band and thereafter engaging the annular portion with a cutting blade having a cutting edge and a series of spaced notches and relatively rotating the cap and cutting blade so that the cutting blade penetrates the annular portion to thereby form a plurality of circumferentially spaced bridges and a series of angularly inwardly disposed tabs.

2. A method as claimed in claim 1, including engaging a bevelled mandrel plate to engage intervals of the cap adjacent an intermediate wall section between the lower terminal edge and annular portion to thereby provide a means for forming the angularly disposed tabs upon cooperative engagement thereof by the cutting blade.

* * * * *